(12) United States Patent
Yoshidome

(10) Patent No.: US 10,735,610 B1
(45) Date of Patent: Aug. 4, 2020

(54) BINDER SCANNER AND PAGE TURNING APPARATUS AND METHOD

(71) Applicant: Kyocera Document Solutions Inc., Osaka (JP)

(72) Inventor: Gin Yoshidome, San Ramon, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/455,451

(22) Filed: Jun. 27, 2019

(51) Int. Cl.
*H04N 1/00* (2006.01)
*B42D 9/06* (2006.01)

(52) U.S. Cl.
CPC .......... *H04N 1/00809* (2013.01); *B42D 9/06* (2013.01); *H04N 1/00628* (2013.01)

(58) Field of Classification Search
CPC .......... B41F 17/02; B42D 9/04; B42D 12/00; B42D 9/06; G07F 19/201; G07F 19/20; B41J 3/283; G06Q 40/12; H04N 1/04; H04N 2201/0434
USPC ................................. 358/498, 497
See application file for complete search history.

(56) References Cited

U.S. PATENT DOCUMENTS

| | | | |
|---|---|---|---|
| 4,942,482 A | 7/1990 | Kakinuma et al. | |
| 5,192,140 A * | 3/1993 | Nukada | B41F 17/02 400/26 |
| 5,267,799 A * | 12/1993 | Nukada | B41F 17/02 400/26 |
| 5,612,791 A | 3/1997 | Turner et al. | |
| 5,640,252 A | 6/1997 | Turner et al. | |
| 5,798,841 A | 8/1998 | Takahashi | |
| 8,646,193 B1 * | 2/2014 | Li | B42D 9/06 40/533 |
| 9,030,718 B1 * | 5/2015 | Lu | H04N 1/04 358/474 |
| 9,695,006 B1 * | 7/2017 | Yoshidome | B26D 1/065 |
| 10,547,758 B1 * | 1/2020 | Yoshidome | G03F 7/70858 |
| 2007/0285742 A1 * | 12/2007 | Wolberg | B42D 9/04 358/498 |
| 2010/0322689 A1 * | 12/2010 | Ohtani | B65H 1/04 399/388 |
| 2011/0233030 A1 * | 9/2011 | Kanda | B41J 3/283 198/382 |
| 2019/0092078 A1 * | 3/2019 | Hasegawa | B42D 9/04 |

* cited by examiner

*Primary Examiner* — Negussie Worku
(74) *Attorney, Agent, or Firm* — James Judge

(57) ABSTRACT

A device (e.g., scanner) for handling a paper holder (binder) having an upper cover, a lower cover, and at least one paper held therein is made available, the device including a control circuit, a lifting mechanism comprising an adhesive member, and an image capturing device. The adhesive member is configured to removably attach to the upper cover of the paper holder. The lifting mechanism is configured to flip the upper cover of the binder open when the adhesive member is attached to the upper cover. The lifting mechanism is configured to detach from the binder and return to its original position after the upper cover is flipped open. The image capturing device is configured to take one or more images of the open binder after the lifting mechanism is detached from the binder and returned to its original position away from the binder after the upper cover is flipped open.

19 Claims, 11 Drawing Sheets

BINDER SCANNER AND PAGE TURNING APPARATUS AND METHOD

FIELD OF THE INVENTION

The present disclosure relates to a lifting mechanism adapted to be employed in a scanner, an image forming apparatus, an optical reader system, a copying machine, or a multi-functional scanner ("MFS"), multi-functional printer, all-in-one ("AIO") printer, or the like, for automatically opening a binder, turning pages inside the binder, and taking images (scan, print, copy) of both sides of each of the pages inside the binder.

BACKGROUND

An electrophotographic image forming apparatus using an intermediate transfer method in order to print a scanned image from a document is widely known. When documents need to be scanned from inside a binder, the binder needs to be opened (locking mechanism disengaged) and the documents first need to be manually removed from the binder, placed onto the transfer or processing unit of the apparatus, and then placed back in the binder in the correct order. This is a timely, tedious, insecure, and error prone process, particularly when involving large volumes of documents and/or sensitive documents.

The present disclosure has been made in light of the above problems associated with the manual process. The present disclosure, for example, automates the process so that a document can be printed or scanned without having to manually remove the document from the binder.

SUMMARY

According to one aspect of the disclosure, a device, e.g., scanner, multi-functional scanner ("MFS"), configured for handling a binder (paper holder) comprising an upper cover, a lower cover, includes: a control circuit; a platform configured to receive the binder; and a lifting mechanism that includes an adhesive member. The lifting mechanism is configured to move in X, Y, and Z directions in response to an instruction from the control circuit. The adhesive member is configured to removably attach to an upper cover of the binder. The lifting mechanism is configured to flip open the upper cover of the binder when the adhesive member is attached to the upper cover. The lifting mechanism is configured to detach from the binder and return to its original position away from the binder after the upper cover is flipped open.

BRIEF DESCRIPTION OF THE DRAWINGS

The following drawings illustrate examples of various components of embodiments of the disclosure disclosed herein and are for illustrative purposes only.

FIG. 5A shows the belt 36 attached to a central portion of the upper cover 410 of the binder 400 (i.e., position 2, adhesive mode, mode A). FIG. 5B shows the belt 36 in a rotatable position (i.e., position 3). FIG. 5C shows the arm 32 after rotating in a semi-circular manner and opening the binder 400 to expose the documents 150 (i.e., position 4). FIG. 5D shows the lifting mechanism 30 in release mode, mode B (i.e., position 5). FIG. 5E shows the binder 400 in an open position (i.e., folder sides 410b and 420a facing upward) and the lifting mechanism 30 in mode A, the belt 36 attached (stuck) to a front side 151a of first page 151 (i.e., position 2). FIG. 5F shows the arm 32 after rotating in a semi-circular manner and flipping the first page 151 so that pages 151 and 152 are both exposed (i.e., position 4). FIG. 5G shows the lifting mechanism 30 in release mode (from the first page 151), mode B (i.e., position 5).

DETAILED DESCRIPTION

Figure 1:
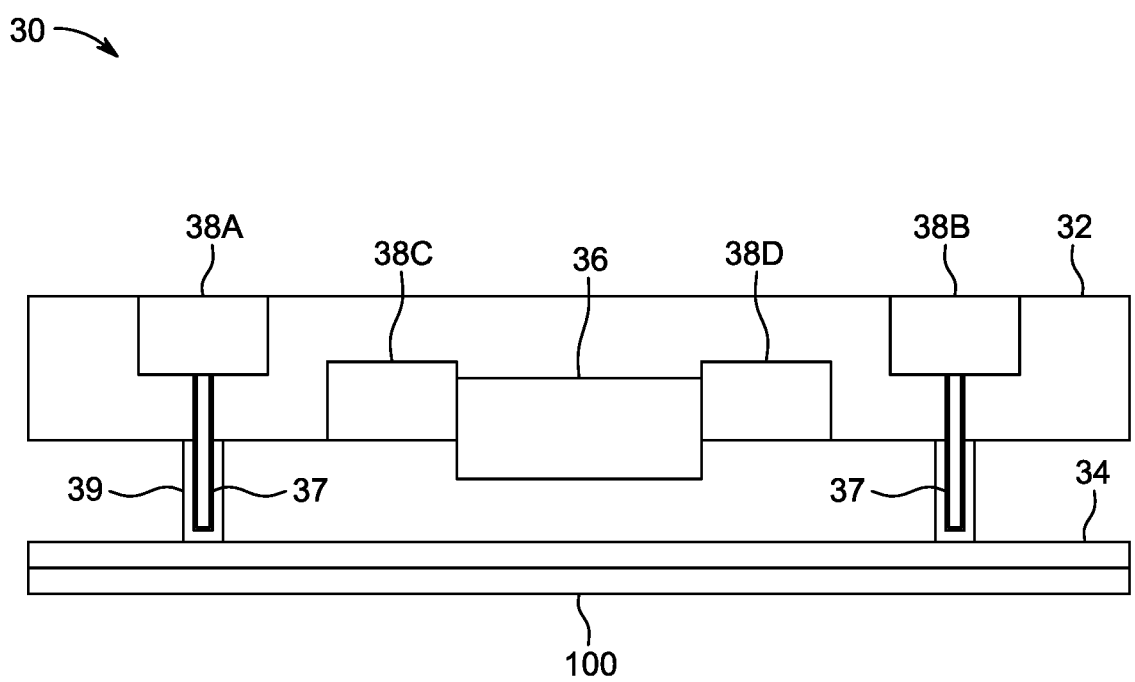
FIG. 1 illustrates a cutaway side view of a first embodiment of lifting mechanism 30 in mode B (release mode).

The inventor has created a method and apparatus for automatically copying, printing, or scanning documents without having to manually remove the documents from inside a paper holder (e.g., folder, binder, etc.)

In one example, illustrated in FIGS. 1-5, a paper holder 400 (e.g., binder) of papers 150 (documents) is placed on a conveyor (e.g., transferring device) or receiving surface of a scanner 1, e.g., multi-functional scanner ("MFS") 1. In this example, the scanner 1 is configured to detect that the object on the receiving surface is a binder 400 (not just a stack of papers 150 or a folder). This detection can be accomplished by a simple user command (e.g., on a control panel or remote communication device) or by taking an image of the object and comparing the image with an image of a folder using a neural network, artificial intelligence (AI), or the like. The conveyor or receiving surface may be a modular component integrated with the scanner 1. A lifting mechanism 30 comprising an arm 32, a plate 34, and an adhesive head 36 (belt) is configured to move to a position above a central upper portion of the folder cover. The mechanical operation of the lifting mechanism 30 (and other components of the scanner 1) is controlled by a control circuit 1500 containing a microprocessor and memory. The arm 32 is configured to move to a position in order to adhere the belt 36 to an upper cover 110 of the binder 400. The arm is also configured to rotate, preferably in a half circle pattern, to lift (open) the upper cover 110. The plate 34 is configured to engage the upper cover 110 prior to the arm 32 retracting from its adherence position in order to release the belt 36 from the open upper cover 110. The lifting mechanism 30 is configured to return to its original position when it is determined that the binder 100 is sufficiently open.

The details of several embodiments of the disclosure will be described below.

The figures are not necessarily shown to scale and some features may be shown larger or smaller than they are with respect to other features in order to facilitate their explanation.

FIG. 1 illustrates a cutaway side view of lifting mechanism 30 in a release mode (mode B). In this embodiment, the lifting mechanism 30 includes an arm 32, a plate 34, an adhesive belt 36, a plurality of motors 38a-d (e.g., servomotors) and shafts 39a-b connecting the arm 32 to the plate 34. The motor 38 may be a rotary actuator or linear actuator that allows for precise control of angular or linear position, velocity and acceleration. It consists of a suitable motor coupled to a sensor for position feedback (not shown). An opening 34a (shown in FIG. 2A) is formed through the plate 34 and is configured to allow a lower portion of the belt 36 to extend through the opening 34a in mode A (adhesive mode) to contact a front side 410a of the binder 400, or front side 150a of page 150 inside the binder 400, described in FIGS. 5A-G. The arm 32 is configured to retract from the plate 34 in mode B (release mode) via operation of at least one of the motors 38a-d. In this embodiment, the motor 38 drives shaft 35 (e.g., corkscrew shaft) to separate the adhesive belt 36 from the upper cover 410 of the binder 400 (described below) while maintaining force against the front side 410a of the upper cover 410 of the binder 400 via the plate 34. Otherwise, the belt 36 would remain adhered to the upper cover 410 of the binder 400 and lift the binder 400 when in mode B (release mode).

Figure 2A:
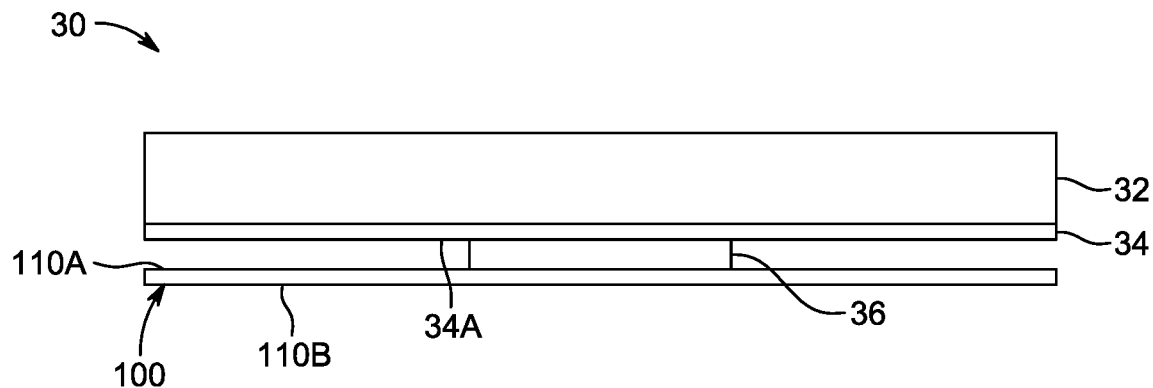
FIG. 2A illustrates a side view of the first embodiment of the lifting mechanism 30 in mode A (adhesive mode).
Figure 2B:
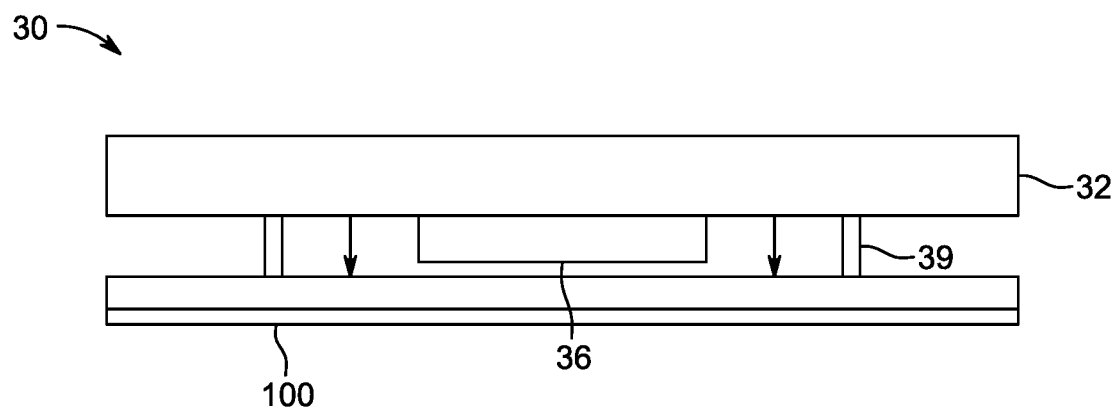
FIG. 2B illustrates a side view of the first embodiment of the lifting mechanism 30 in mode B (release mode)

FIGS. 2A and 2B illustrate a side view of the lifting mechanism 30 in mode A (adhesive mode) and mode B (release mode), respectively. As described below, the lifting mechanism 30 enters mode B after the binder 400 is in an open position (folder sides 410b and 420a facing upward), e.g., after the arm 32 has rotated in a half circle pattern to flip the binder cover 410 open.

As shown in FIG. 2A, in mode A, the belt 36 is configured to extend through an opening formed in the plate 34 to contact the binder 400. The plate 34 does not contact the binder 400 in mode A. Instead, the plate 34 is positioned adjacent or directly against an opposing surface of the arm 32.

As shown in FIG. 2B, in mode B, the plate 34 contacts the binder 400. The plate 34 is driven away from the arm 32 (and the belt 36) and towards the binder 400 by operation of a retractable (extendable) shaft 39 driven by at least one of the motors 38a-d. The retractable shaft 39 extends from inside the arm 32 to the plate 34. In mode B, the shaft 39 is extended, which prevents the belt 36 from extending entirely through the plate 34 and adhering to the upper cover 410, more preferably the belt 36 does not extend to a surface of the plate 34, and most preferably the belt 36 and the plate 34 are separated by a predetermined distance.

Figure 3:
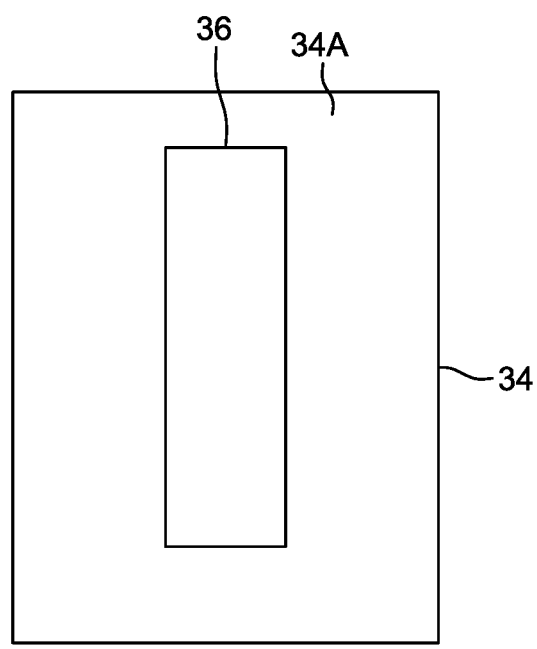
FIG. 3 illustrates a bottom view of the first embodiment of the lifting mechanism 30.

FIG. 3 illustrates a bottom view of the lifting mechanism 30. As shown, an opening 34a is formed in the plate 34 and the belt 36 is viewable through the opening 34a in mode B and extends through the opening in mode A. The plate 34 and belt 36 are rectangles in this embodiment, but it is known that they can be formed in other geometric shapes. The belt 36 comprises a sticky residue to adhere to a surface of the binder 400, paper 150, sufficient bond to flip the cover 410 or paper 150 over, e.g., sticky note adhesive-type.

Figure 4A:
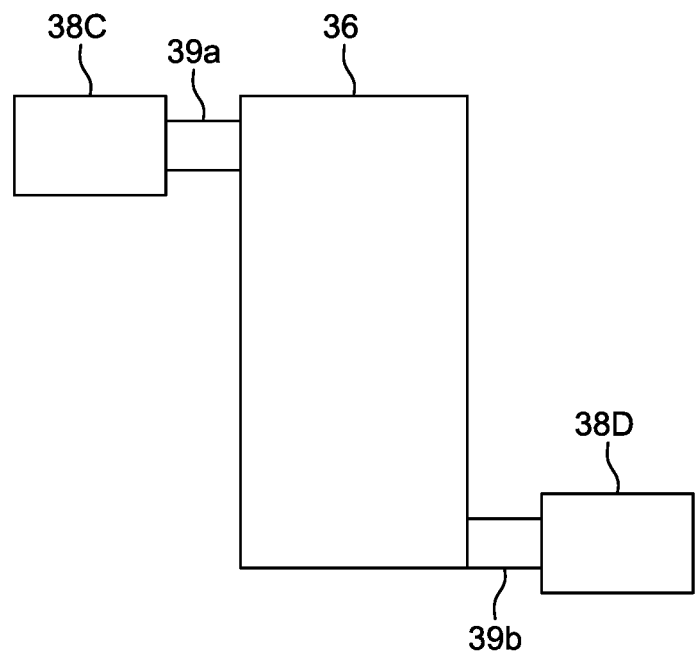
FIG. 4A illustrates a top view of the first embodiment of the belt 36.
Figure 4B:
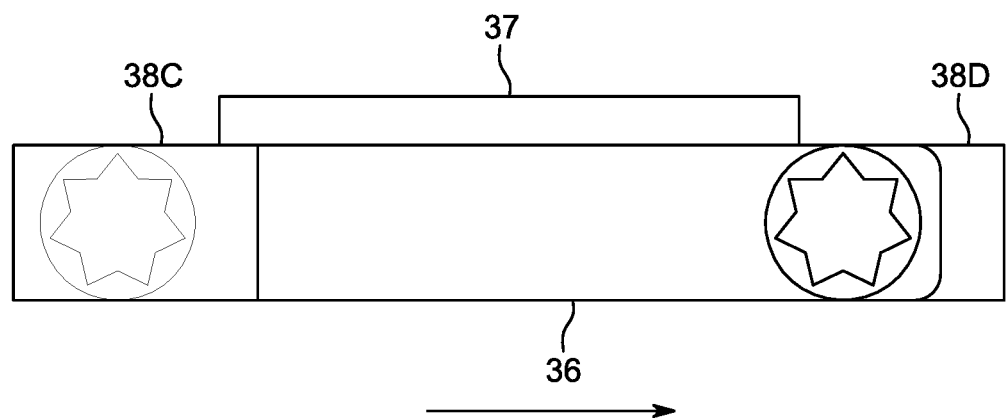
FIG. 4B illustrates a side view of the first embodiment of the belt 36.

FIGS. 4A and 4B illustrate a top view and side view, respectively, of the belt 36.

As shown in FIG. 4A, the belt 36 is driven by a plurality of motors, 38c, 38d. In this embodiment, each of the motors 38c and 38d engages a drive shaft 39a and 39b arranged on opposite ends and sides of the belt 36.

As shown in FIG. 4B, an adhesive reservoir 37 (e.g., reglue/restick pad) may be arranged in communication with the belt 36. The belt 36 is positioned to contact the content of the reservoir 37 to transfer a portion of the content to the belt 36. This helps maintain the necessary adhesive properties of the belt 36, minimize the occurrence of a dry belt (e.g., running out of adhesive), and overcome the problems with paper fibers building up on the belt 36 and gradually reducing the tackiness of the lifting mechanism 30. In this embodiment, the reservoir 37 is arranged adjacent to an upper surface of the belt 36, but it is known that the reservoir 37 can be arranged in any suitable location that applies renewal adhesive material to the belt 36 and does not interfere with other components in the scanner 1 or lifting mechanism 30.

In another example, illustrated in FIGS. 5A-G, a binder 400 (e.g., hard cover binder, soft cover binder, ring binder, arch mechanism binder, etc.) of secured papers 150 (documents, pages) is placed on a receiving surface (or conveyor) of a scanner 1 or multi-functional scanner (MFS). The binder 400 comprises an upper cover 410 having a front side 410a and back side 410b and a lower cover 420 having a front side 420a and a back side 420b. The scanner 1 is designed to open the binder 400, automatically flip each of the pages 150, and capture images of both sides of each page 150 in the binder 400. In this example, the secured papers 150 includes a first page 151, second page 152, and an nth page 150n.

The scanner 1 may be configured to detect that an object on the receiving surface of the scanner 1 is a binder 400 (not just a stack of papers 150 or a folder). An example of such a detection method and apparatus is described above with respect to the first embodiment of the disclosure.

The scanner 1 includes the lifting mechanism 30 (described above and illustrated in FIGS. 1-4) that comprises the arm 32, the plate 34, and the adhesive head 36 (belt). (Adhesive head, adhesive belt, and belt can be used interchangeably.) The lifting mechanism 30 is configured to move from a first position (original position away from the binder 400) to a second position above a central upper portion of the upper cover 410. The mechanical operation of the lifting mechanism 30 (and other components of the scanner 1) is controlled by the control circuit 1500 containing a microprocessor and memory. The arm 32 is configured to move to a position in order to adhere the adhesive head 36 to the front side 410a of the upper cover 410 of the binder 400. The arm 32 is configured to rotate, preferably in a half circle pattern, to lift (open, flip) the upper cover 410 to a position wherein the back side 410b of the upper cover 410 is exposed and the front side 410a faces a top surface of the receiving surface.

The plate 34 is configured to engage the upper cover 410 prior to the arm 32 retracting from its adherence position in order to release the adhesive head 36 from the upper cover 410. The lifting mechanism 30 is configured to return to its original position (away from the binder 400) when it is determined that the upper cover 410 is sufficiently open.

The scanner 1 may include a sensor (e.g., piezoelectric sensor, light sensor, camera etc.) on the receiving surface to determine that the binder 400 is sufficiently opened before releasing the belt 36 from the upper cover 410. The scanner 1 may also determine that the binder 400 is sufficiently opened based on the rotational angle of the arm 32 of the lifting mechanism 30. After it is determined that the binder 400 is sufficiently opened, the lifting mechanism 30 releases the belt 36 from the upper cover 410. The lifting mechanism 30 then retreats from the binder 400. In one embodiment the lifting mechanism returns to the original position.

The scanner 1 includes an image capturing device 450 (e.g., scanner, camera, etc.) positioned above the binder 400, e.g., in a facing-down suspended position. The position of the image capturing device 450 is configured to be adjustable in a vertical direction to zoom in on the document surface as much as possible to achieve the highest possible resolution, and in a horizontal position so that the camera lens is placed straight over the center of the document.

The device 450 is configured to take one or more images of (i.e., scan) the open binder 400 (after the lifting mechanism 30 retreats from the binder 400 and does not obstruct the camera view) to capture and record images of the exposed surface of each page 150 inside the binder 400 without having to manually remove the pages 150 from the binder 400. For example, the image capturing device 450 takes an image of a front side 151a of the first page after the binder 400 is opened. The front side 151a is the top surface of the papers 150 positioned on the front side 420a of lower cover 420.

According to one embodiment, the image capturing device 450 takes a digital picture of the exposed document (s) and creates a bitmap image data file. The captured bitmap image data is encoded and compressed by a microprocessor or is temporarily stored in a memory unit and later encoded and compressed by the CPU. The data may be transmitted to a host computer.

According to one embodiment, once the image capturing device 450 captures the image (takes the digital picture), the CPU communicates with the lifting mechanism 30.

The lifting mechanism 30 then repeats the process after the image capturing device 450 captures and records an image of the front side 151a; for example the lifting mechanism 30 flips the first page 151 (same manner as flipping the upper cover 410 open) after a front side 151a of the first page 151 has been captured by the image capturing device 450. The image capturing device 450 then takes an image of an exposed surface of each exposed page, i.e., back side 151b and front side 152a. The process ends when it is determined that the lower cover 420 of the binder 400 is page-free (i.e., all pages 150 have been flipped and captured by the image capturing device 450). Further details of this embodiment are described below.

The figures are not necessarily shown to scale and some features may be shown larger or smaller than they are with respect to other features in order to facilitate their explanation.

FIGS. 5A-G illustrate a plan view of a process of opening a binder 400, flipping the pages 150 using the lifting mechanism 30 described in FIGS. 1-4, and capturing one or more images of the pages 150 that are exposed using the image capturing device 450.

Figure 5A:
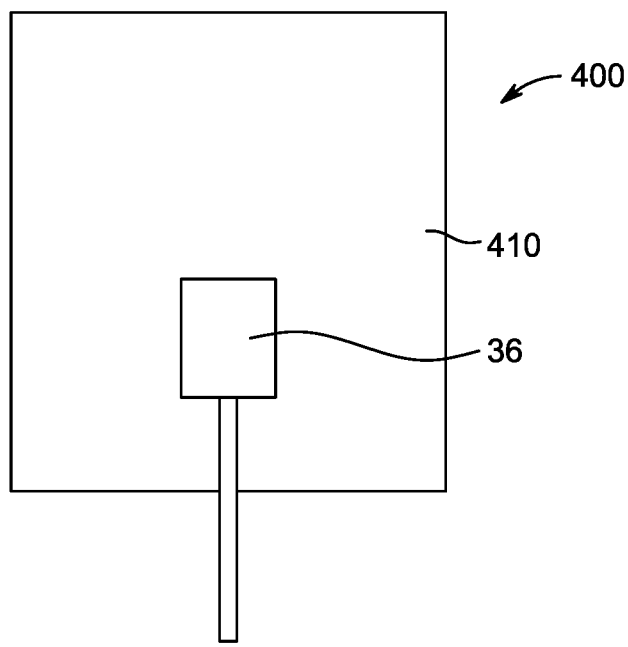
FIG. 5A-G illustrate a plan view of a process of opening a binder 400 and capturing images of both sides of each page 150 in the binder 400 using the lifting mechanism 30 described in FIGS. 1-4 and an image capturing device 450.

FIG. 5A shows the belt 36 attached (stuck) to a central portion of the upper cover 410 (i.e., position 2, adhesive mode, mode A) of the binder 400, i.e., after having moved from an original position (i.e., position 1). This step may occur after the scanner 1 detects a binder 400 on the receiving surface.

Figure 5B:
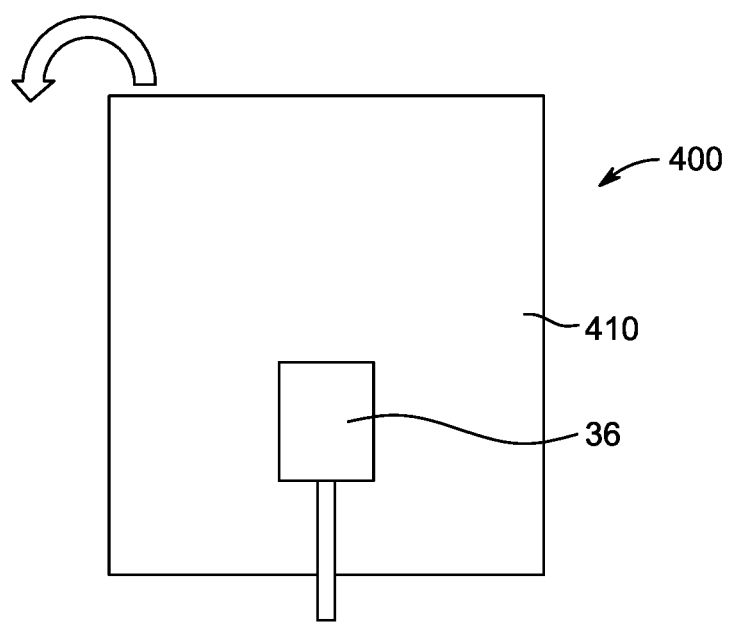

FIG. 5B shows the belt 36 in a rotating position above the central portion of the upper cover 410 (i.e., position 3).

Figure 5C:
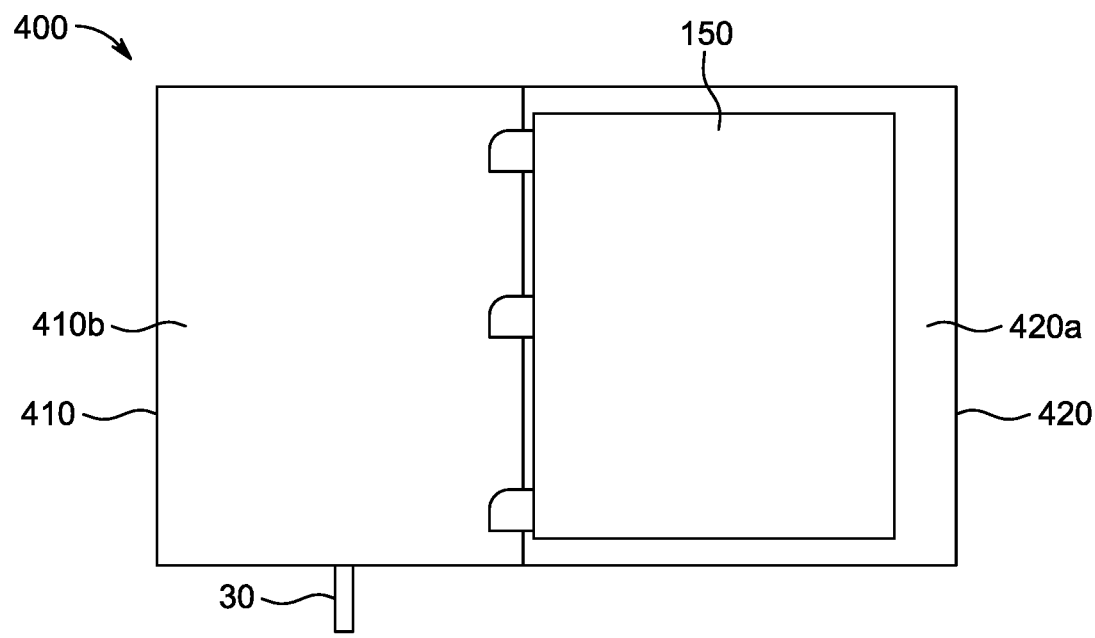

FIG. 5C shows the arm 32 after rotating in a semi-circular manner and opening an upper cover 410 of the binder 400 (back side 410b exposed) to expose the documents 150 positioned on a front side 420a of the lower cover 420 of the binder 400 (i.e., position 4).

Figure 5D:
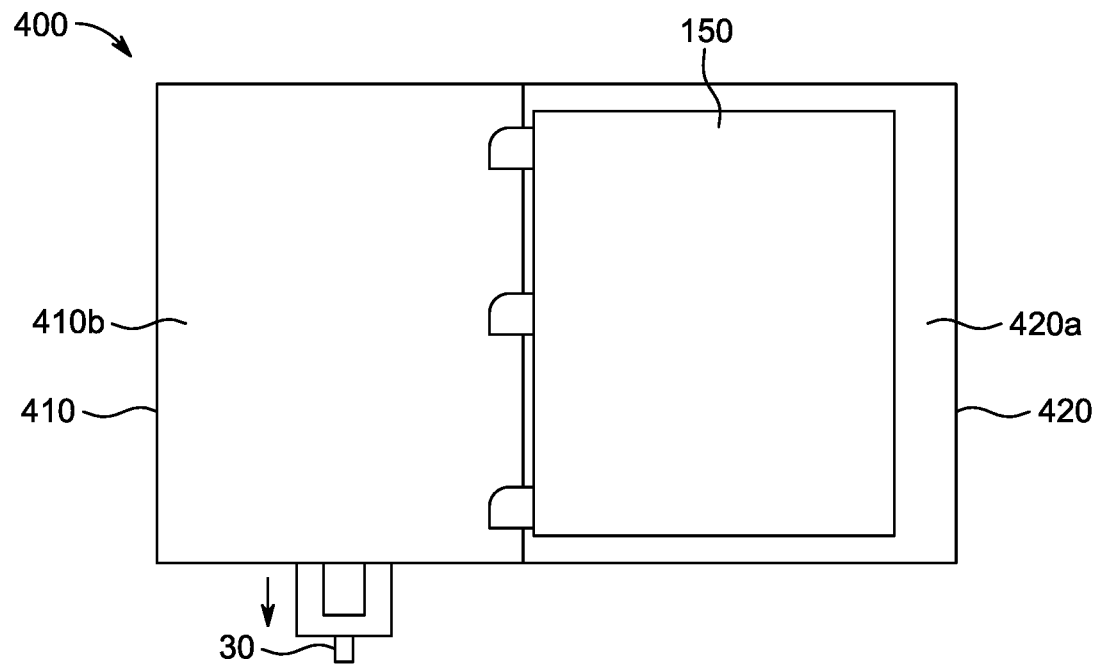

FIG. 5D shows the lifting mechanism 30 in release mode, mode B (i.e., position 5), wherein the lifting mechanism 30 retreats away from the binder 400.

The image capturing device 450 is configured to take one or more images of (i.e., scan) the exposed surfaces of the open binder 400 (i.e., 410b and 420a) after it is determined that the lifting mechanism has retreated to a predetermined position away from the binder 400.

Figure 5E:
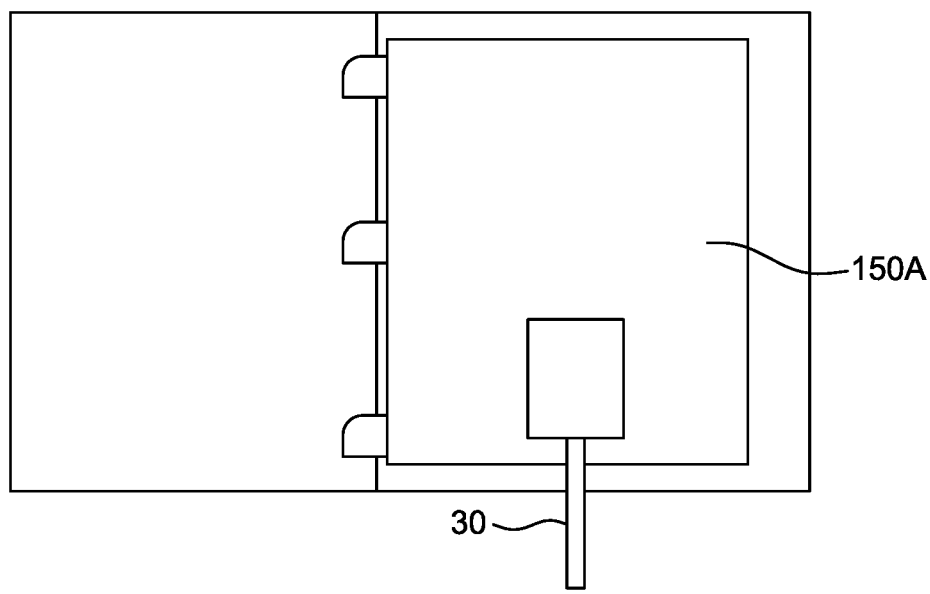

FIG. 5E shows the binder 400 in an open position (i.e., folder sides 410b and 420a facing upward) and the lifting mechanism 30 in mode A, with the belt 36 attached (stuck) to a front side 151a of first page 151 (i.e., position 2).

Figure 5F:
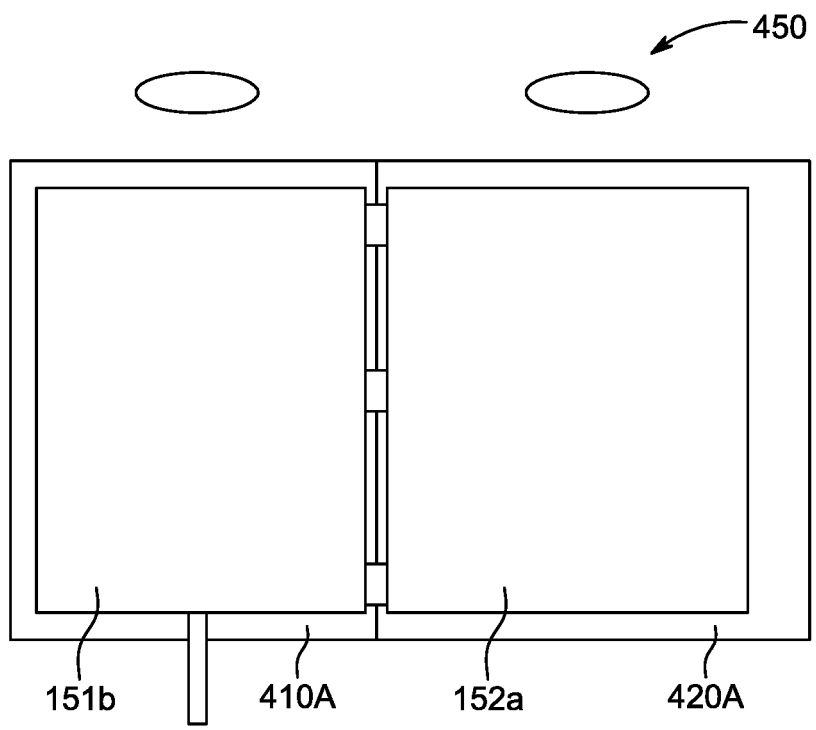

FIG. 5F shows the arm 32 after rotating in a semi-circular manner and flipping the first page 151 so that pages 151 and 152, i.e., back side 151b and front side 152a, are both exposed (i.e., position 4).

Figure 5G:
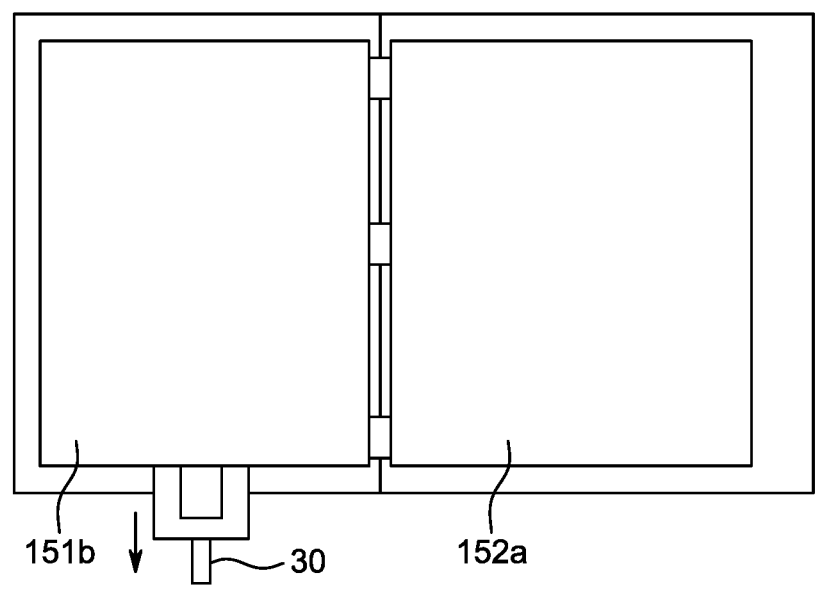

FIG. 5G shows the lifting mechanism 30 in release mode (from the first page 151), mode B (i.e., position 5). The image capturing device 450 is configured to take one or more images of (i.e., scan) the exposed surface of the open binder 400 (i.e., back side 151b of first page 151 and front side 152a of second page) after it is determined that the lifting mechanism retreated to a predetermined position away from the binder 400.

Figure 6:
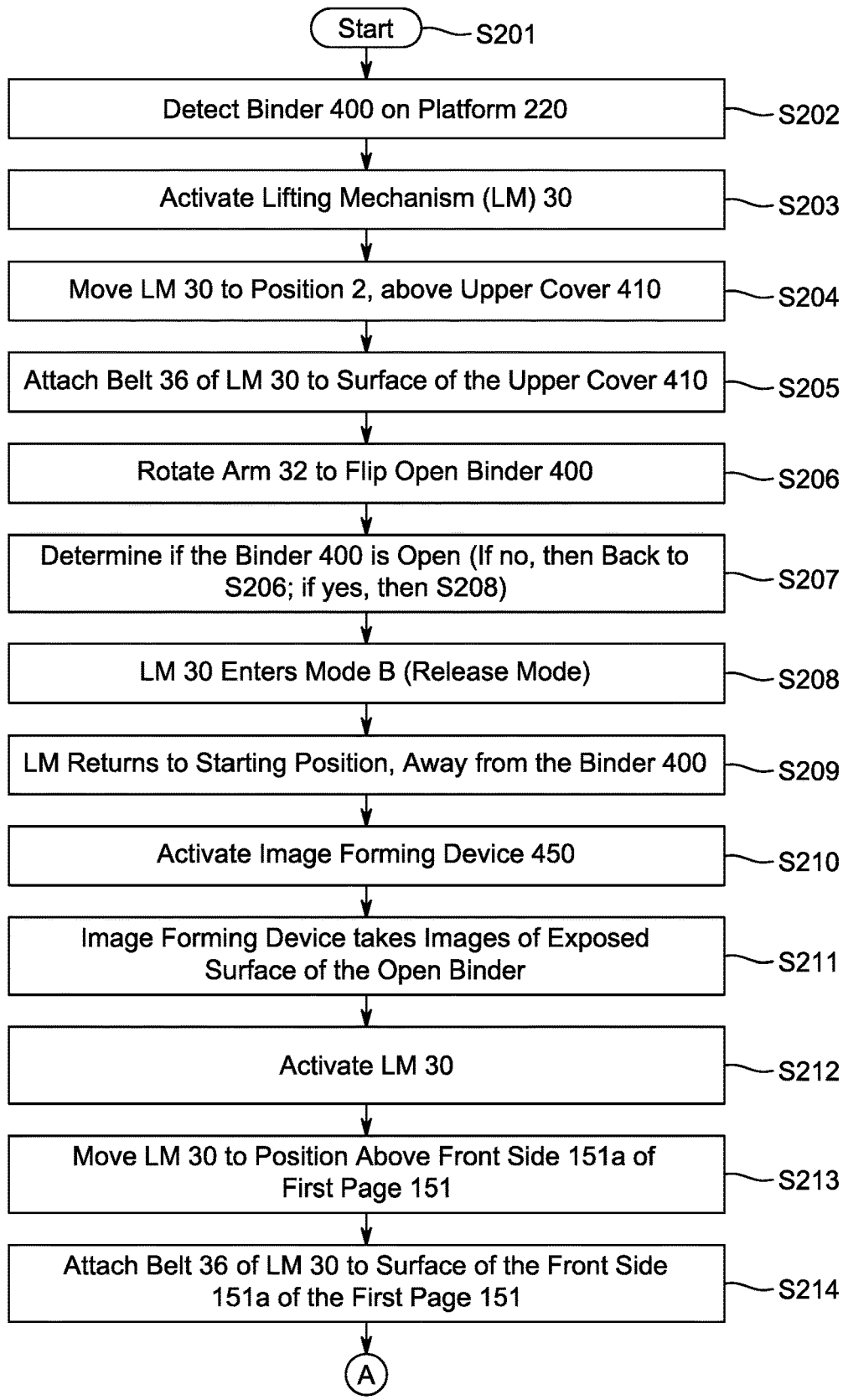
FIG. 6 is a flowchart illustrating one embodiment of a control process of opening a binder 400 and capturing images of both sides of each page 150 in the binder 400 using the lifting mechanism 30 described in FIGS. 1-4 and an image capturing device 450.
Figure 6:
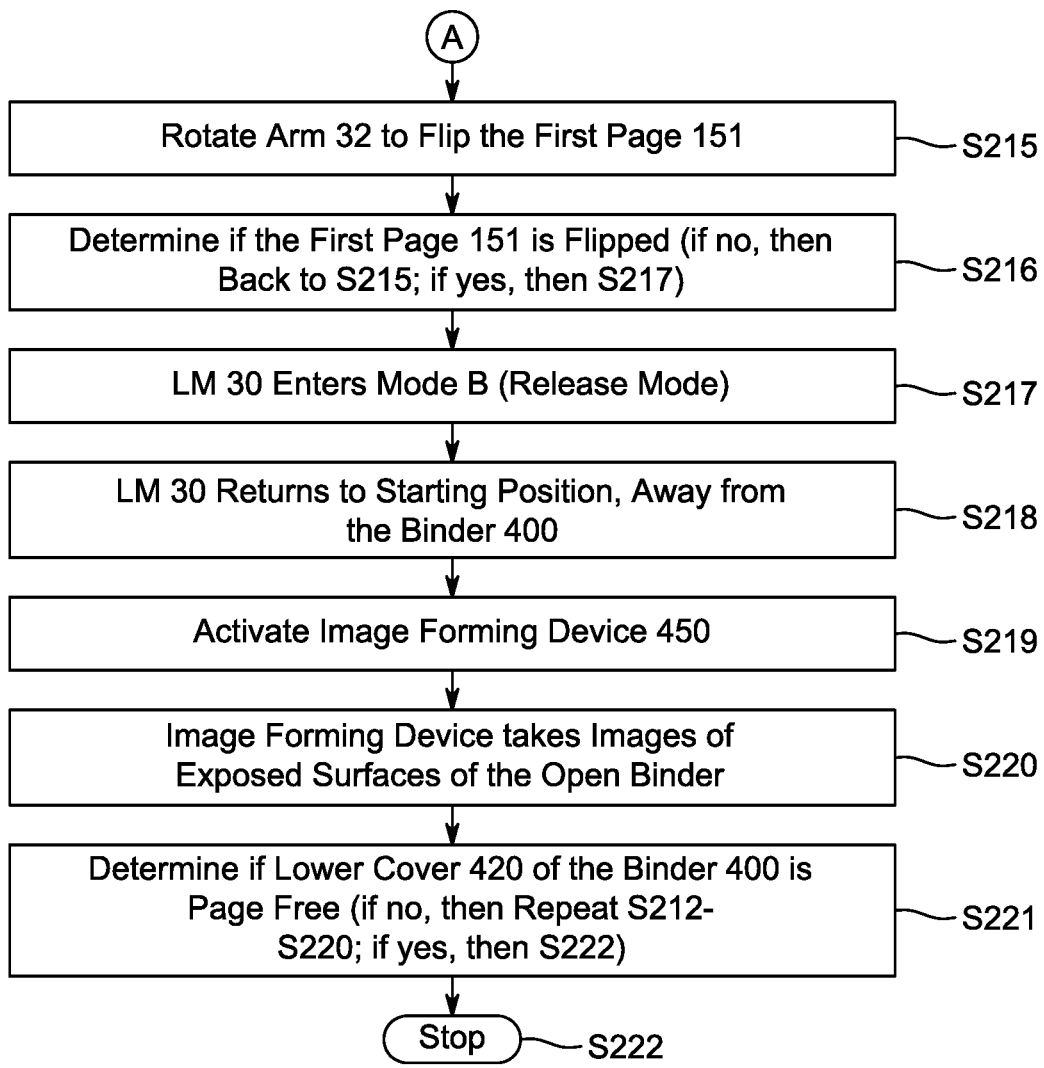

FIG. 6 is a flowchart illustrating one embodiment of a control process of opening a binder 400 and capturing images of both sides of each page 150 in the binder 400 using the lifting mechanism 30 described in FIGS. 1-4 and an image capturing device 450.

In the on position (S201), the scanner 1, configured with the control circuit 1500, detects a binder 400 on a platform (receiving surface) (S202). The control circuit 1500 sends a signal to the servomotors 38a, 38b to activate the lifting mechanism 30 (S203). The lifting mechanism 30 moves to position 2 (described above), which is above upper cover 410 (S204). The belt 36 of the lifting mechanism 30 then attaches (sticks) to a surface of the upper cover 410 (S205). The lifting mechanism then rotates arm 32 to flip open the binder 400 (S206). The control circuit 1500 determines whether the binder is in an open position (S207). If no, then the control process repeats S206. If yes, then the lifting mechanism 30 enters mode B, release mode (described above) (S208). Next, the lifting mechanism 30 returns to its starting position, away from the binder 400 (S209). After the folder is opened and the lifting mechanism 30 is out of the way, the control circuit 1500 activates the image capturing device 450 (S210) and the device 450 takes images of exposed surfaces of the open binder 400 (S211). Next, the control circuit 1500 activates the lifting mechanism 30 (S212), and the lifting mechanism moves to a position above the front side 151a of the first page 151 (S213). Next, the belt 36 attaches to a surface of the front side 151a of the first page 151 (S214) and the arm 32 rotates to flip the first page 151 (S215). The control circuit 1500 then determines whether the first page is flipped (S216). If no, then the control process repeats S215. If yes, then the lifting mechanism 30 enters mode B, release mode (described above) (S217) and the lifting mechanism 30 returns to its starting position, away from the binder 400 (S218). Next, the control circuit 1500 activates the image capturing device 450 (S219) and the device 450 takes images of exposed surfaces of the open binder 400 (S220). Next, the control circuit 1500 determines if a lower cover 420 of the binder 400 is page-free (S221). If no, then the control process repeats S212-S220. If yes, then the control process ends (S222).

Figure 7:
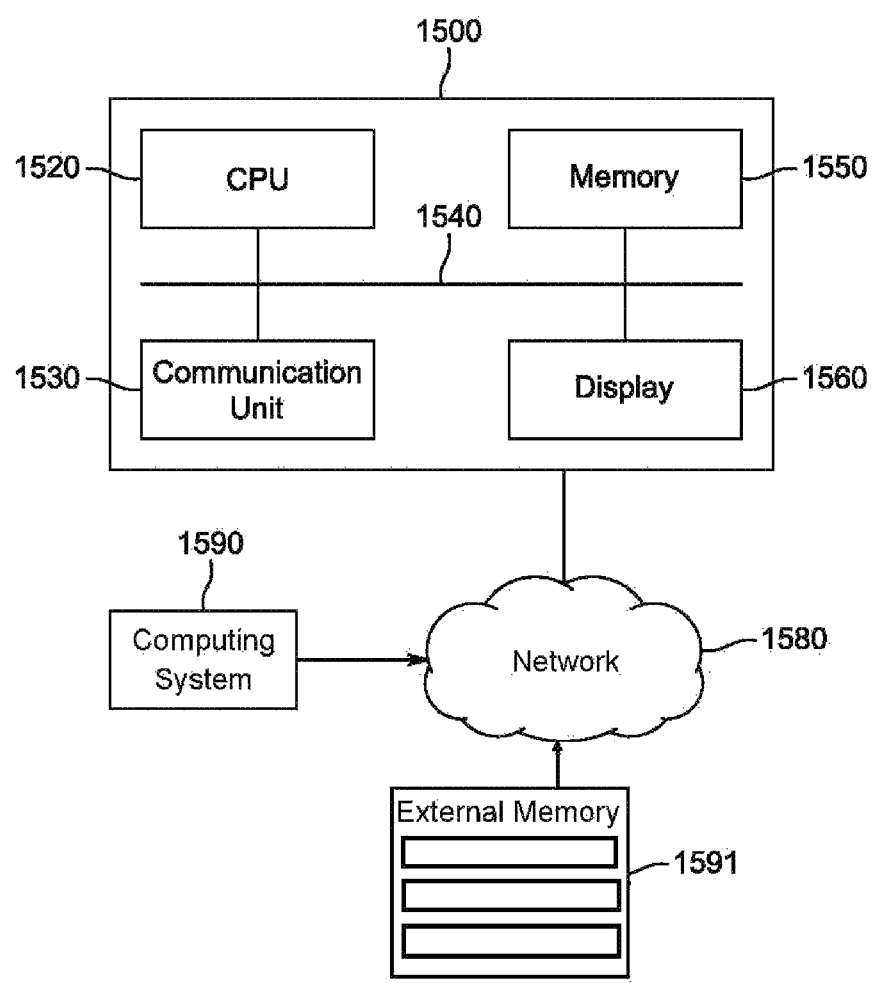
FIG. 7 is a diagram of example components of the control circuit 1500 which may be used to implement one or more aspects of the lifting mechanism 30.

FIG. 7 illustrates an example of a control circuit 1500 that can be used in a scanner and used to control the paperclip attachment system 10, according to an embodiment of the present disclosure. The control circuit can be implemented on a computer, or scanner. The control circuit 1500 can control the scanner and elements of the paperclip attachment system 10, including the push-up bar 40, push-down bar 20, conveyor belt 50, paperclip clamping assembly 70, and paperclip dispensing system 60.

The control circuit 1500 may optionally be networked to another computing system 1590 via a network 1580, such as the Internet or a local area network (LAN) although network 1580 and computing system 1590 need not be part of the control circuit 1500. The control circuit 1500 can include a CPU 1520, memory 1550, communications unit 1530, display 1560, all connected via a bus 1540. It is noted that one or more control circuits 1500 can be used to implement various aspects of certain embodiments of the disclosure.

The control circuit 1500 can be implemented by one or more scanner's, or various forms of digital computers, such as laptops, desktops, workstations, servers, blade servers, mainframes, and other appropriate computers. The components shown here, their connections and relationships, and their functions, are meant to be examples only, and are not meant to limit embodiments of the disclosure described and/or claimed in this document.

Each of the components of the control circuit 1500 are interconnected using various busses and may be mounted on a common circuit board or in other manners as appropriate. The central processing unit 1520 can process instructions for execution within the control circuit, including instructions stored in the memory or on the storage device to display graphical information on a display. In other embodiments, multiple processors and/or multiple buses may be used, as appropriate, along with multiple memories and types of memory. Also, multiple control circuits may be interconnected.

The central processing unit 1520 may be implemented as an integrated circuit that includes separate and/or multiple analog and digital processors. Additionally, the CPU may be implemented using any of several architectures. For example, the processor may be an x86 processor, RISC (reduced instruction set computers) processor. The processor may coordinate with the other components of the device, such as control of user interfaces, applications run by the device, and wireless communication. Multiple processors or processors with multiple cores may also be used. The processor is primarily responsible for performing the functions discussed in this document, however, a GPU may also be used.

The processor may communicate with a user through a control interface and display interface coupled to a display. The display may be, for example, an LED (liquid crystal display) display, or other appropriate display technology. The display interface may comprise suitable circuitry for driving the display to present graphical and other information to a user. The control interface may receive commands from a user and convert them for submission to the processor. In addition, an external interface may be provided in communication with processor to enable near field communication with other devices. An external interface may provide, for example, for wireless and/or wired communication. Multiple interfaces may also be used.

Input to the control circuit 1500 may be done with a personal computer, server, or other computing device 1590.

The CPU 1520 operates according to a program stored in memory 1550. The CPU 1520 controls the communication unit 1530 and the display 1560. The program may be provided through the network 1580 such as the Internet or provided by being stored in a computer-readable information storage medium such as a DVD-ROM or a USB memory.

The memory 1550 includes, for example, a memory device such as a RAM or a ROM and a hard disk drive. The memory 1550 stores the program. The memory also stores information or computational result input from each unit.

The communication unit 1530 can be a network card which is configured to communicate with other devices, such as a web server or other computers. The communication unit 1530 inputs information received from other devices into the CPU 1520 or the memory 1550 based on the control of the CPU 1520 and sends the information to other devices.

Bus 1540 is configured to send or receive data to/from the CPU 1520, memory 1550, the communication unit 1530, and the display 1560. For example, the CPU 1520 or memory 1550 is connected to the display 1560 through an expansion bus in the bus 1540.

The in-device memory can be composed of a DRAM. The in-device memory is connected to the CPU 1520 and the memory 1550 through the bus 1540. The high-speed memory is composed of, for example, a SRAM that is capable of higher speed access than the in-device memory.

The control circuit 1500, which controls a scanner, can be part of a document processing system. For example, documents which contain paperclips, can be input into the scanner, and once the documents are scanned/digitized and saved to an internal memory 1550 or external memory 1591, paperclips can be attached or re-attached to the documents. Once the documents are stored in memory, the documents could be processed or manipulated in any number of ways.

An example of an external memory 1591 could be another computer/server which is connected to the scanner directly or through a network. Further, the external memory 1591 could be cloud storage, for example. While FIG. 10 shows the external memory 1591 connected to the control circuit 1500 through network 1580, the external memory 1591 could also be directly connected to the control circuit 1500.

The document processing system could intake reams of documents and scan each document and then attach paperclips to the documents without needing a human being to do so. The system could be used to digitize hospital records, for example.

A number of embodiments of the disclosure have been described. It should be understood that various modifications may be made without departing from the spirit and scope of the disclosure. For example, various forms of the flows shown above may be used, with steps re-ordered, added, or removed. Also, although several embodiments of authorizing a remote terminal or mobile device have been described, it should be recognized that numerous other applications are contemplated. Accordingly, other embodiments are within the scope of the following claims.

What is claimed is:

1. A device configured for handling a paper holder comprising an upper cover and a lower cover, the device comprising:
   a control circuit;
   a platform configured to receive the paper holder; and
   a lifting mechanism configured to move in X, Y, and Z directions in response to an instruction from the control circuit, the lifting mechanism comprising
   a belt having an adhesive member and being driven by at least one servomotor, the adhesive member being configured to removably attach to the upper cover of the paper holder an arm configured to move to a position such that the belt attaches to a desired position on the upper cover of the paper holder, and configured to rotate in a half circle pattern to rotate and flip the upper cover of the paper holder open when the adhesive member is attached to the upper cover, and a plate; wherein the lifting mechanism is configured to detach from the paper holder and return to its original position away from the binder after the upper cover is flipped open.

2. The device according to claim 1, further comprising:
a plurality of servomotors configured to control movement of the lifting mechanism.

3. The device according to claim 2, wherein the image capturing device takes a digital picture and creates a bitmap image file, and captured bitmap data is encoded and compressed by a microprocessor or is temporarily stored in a memory unit and later encoded and compressed by the microprocessor.

4. The device according to claim 2, wherein the image capturing device is a scanner or camera.

5. The device according to claim 2, further comprising:
a servomotor in communication with the image capturing device, wherein the image capturing device is configured to move in a vertical direction to zoom in on a target surface to achieve a desired resolution, and the image capturing device is configured to move in a horizontal direction to position a camera lens of the image capturing device above a center portion of the target surface.

6. The device according to claim 1, wherein the lifting mechanism further comprises a shaft attached to the plate and driven by a motor to extend and retract from the arm, an opening is formed in the plate, the belt is configured to extend through the opening to adhere to the upper cover, the arm is configured to detach from the paper holder and return to its original position away from the paper holder after the upper cover is flipped, the shaft is configured to extend the plate away from the arm to release the belt from the upper cover.

7. The device according to claim 1, further comprising:
an adhesive reservoir arranged in communication with the belt, wherein the rotating belt is positioned to contact a content of the reservoir to transfer a portion of the content to the belt.

8. The device according to claim 1, further comprising:
an image capturing device positioned above the paper holder, wherein the image capturing device is configured to move in a direction that is co-planer with the paper holder, and the image capturing device is configured to take one or more images of the open paper holder after the lifting mechanism is detached from the paper holder and returned to its original position away from the paper holder after the upper cover is flipped open.

9. The device according to claim 8, further comprising:
at least one paper sandwiched between the upper cover and the lower cover, wherein the lifting mechanism is configured to flip over a top paper of the at least one paper sandwiched between the upper cover and the lower cover after it is determined that the image capturing device took one or more images of a front side of the top paper, and the lifting mechanism is configured to detach from the top paper and return to its original position away from the paper holder after the top paper is flipped over.

10. The device according to claim 9, wherein the image capturing device is configured to take one or more images of the open paper holder after the lifting mechanism is detached from the top paper and returned to its original position away from the paper holder after the top paper is flipped over.

11. The device according to claim 10, wherein the control circuit determines whether a lower cover of the paper holder is page-free.

12. The device according to claim 11, wherein the lifting mechanism is configured to flip the lower cover of the binder closed when it is determined that the lower cover of the paper holder is page-free, and the lifting mechanism is configured to detach from the paper holder and return to its original position away from the paper holder after the lower cover is flipped closed.

13. The device according to claim 1, further comprising a stack of papers sandwiched between the upper cover and the lower cover.

14. The device according to claim 1, wherein the platform is a conveyor belt.

15. The device according to claim 1, wherein the control circuit is configured to determine that an object on the platform is the paper holder.

16. The device according to claim 15, wherein the determination is made by taking an image of the object and comparing the image with an image of a paper holder.

17. A device configured for handling a paper holder comprising an upper cover and a lower cover, the device comprising:

a control circuit;

a platform configured to receive the paper holder;

a lifting mechanism controlled by the control circuit, the lifting mechanism configured to move in X, Y, and Z directions in response to an instruction from the control circuit, and comprising a belt having an adhesive member and being driven by at least one servomotor, the adhesive member being configured to removably attach to the upper cover of the paper holder, and an arm configured to move to a position such that the belt attaches to a desired position on the upper cover of the paper holder, and configured to rotate in a half circle pattern to rotate and flip the upper cover of the paper holder open when the adhesive member is attached to the upper cover; and an image capturing device controlled by the control circuit, the image capturing device positioned above the paper holder; wherein the lifting mechanism is configured to detach from the paper holder and return to its original position away from the paper holder after the upper cover is flipped open, and the image capturing device is configured to take one or more images of the open paper holder after the lifting mechanism is detached from the paper holder and returned to its original position away from the paper holder after the upper cover is flipped open.

18. The device according to claim 17, wherein the control circuit is configured to determine that an object on the platform is the paper holder, and the determination is made by taking an image of the object with the image capturing device and comparing the image with an image of a paper holder.

19. A method for automatically opening a paper holder and processing images of documents contained inside the paper holder, using a device, the method comprising:
  detecting the paper holder on a platform of the device;
  moving a lifting mechanism from its original position to a position above an upper cover of the paper holder;
  attaching the lifting mechanism to the upper cover of the paper holder;
  rotating the lifting mechanism to flip open the upper cover of the paper holder;
  detaching the lifting mechanism from the upper cover of the paper holder;
  moving the lifting mechanism to the original position, the original position being away from the paper holder;
  activating an image capturing device positioned above the opened paper holder;
  capturing images of exposed surface of the open paper holder;
  moving the lifting mechanism to a position above a front side of a first page of the documents;
  attaching the lifting mechanism to a surface of the front side of the first page of the documents;
  rotating the lifting mechanism to flip over the first page;
  detaching the lifting mechanism from the first page;
  moving the lifting mechanism to the original position;
  capturing images of the exposed surface of the open paper holder; and
  determining if a lower cover of the paper holder is page-free.

* * * * *